United States Patent Office 2,955,349
Patented Oct. 11, 1960

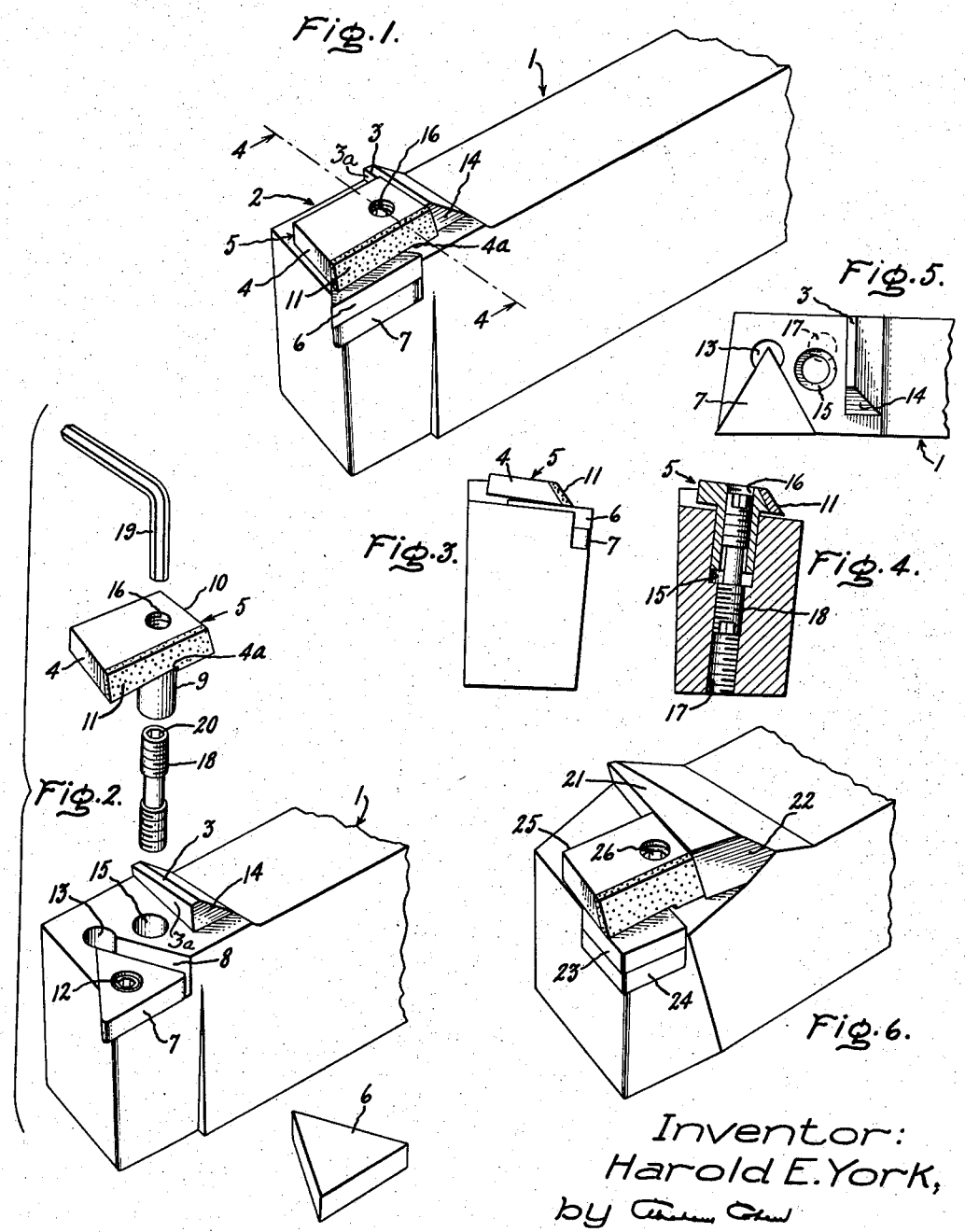

2,955,349

CUTTING TOOL

Harold E. York, St. Clair Shores, Mich., assignor to General Electric Company, a corporation of New York Filed Mar. 13, 1958, Ser. No. 721,232

1 Claim. (Cl. 29—96)

This application is a continuation-in-part of my early application, now abandoned, Serial No. 529,767 filed August 22, 1955 and assigned to same assignee as the present invention.

This invention relates to a cutting tool in which a cutting tool holder releasably holds a removable cutting insert composed of an extremely hard cutting material, such as a cemented carbide or cemented oxide.

In my copending parent application, I have described an improved cutting tool which is simple in construction, compact in design, and which has great versatility in use. The tool holder there described possesses, among other advantages, an absence of overhead construction and therefore an absence of obstruction to the free flow of chips. In addition, the tool holder is designed so that the cutting thrust is dissipated through the entire length of the shank of the tool holder.

Among the principal objects of the present invention are the provision of a cutting tool holder possessing all the advantages of the tool holder described in my aforesaid copending application, Serial No. 529,767 and which possesses the additional advantages of having a self-loosening clamp, accessible for purposes of loosening from both the top and bottom of the cutting tool, and which has even greater versatility in use. A major advantage of the cutting tool of this invention is the provision of maximum holding power or clamping pressure at the outer extremity of the cutting edge. Other objects will appear from the description of the invention which follows.

In general, the objects of my invention are achieved by providing a tool holder having one or more recesses in the head portion in which removable seats may, if desired, be secured. A vertical shoulder provided on a ridge on the upper surface of the tool holder defines the rear boundary of the head portion. A cutter bit clamp aligns with the vertical shoulder and overhangs the recess to securely hold the cutter bit in place while transmitting the cutting thrust throughout the shank of the toolholder. The clamp possesses a downward projecting stem which is received by an aperture in the head portion of the cutting tool, the aperture being offset from the recess in the head portion. A vertically disposed differential set screw, accessible from the top or bottom of the toolholder, secures the clamp and insert in position. The clamp itself acts as a chipbreaker and possesses guide means which in combination with the shoulder of the cutting toolholder securely positions the clamp and cutting insert in place. The clamp is easily and securely locked into position by the set screw. The design of the clamp or chip breaker and the tool holder provides for a greater freedom from chip interference than cutting tool holders have heretofore possessed.

The invention will be more clearly understood from the following description taken in conjunction with the accompanying drawing in which Fig. 1 is a perspective view, partially cut away, of one embodiment of the cutting tool of the present invention, Fig. 2 is an exploded view of the embodiment shown in Fig. 1.

Fig. 3 is a front elevation of the embodiment shown in Fig. 1,

Fig. 4 is a cross sectional view taken along the lines 4—4 of Fig. 1,

Fig. 5 is a plan view of the embodiment shown in Fig. 1, with the clamp and cutter bit removed, and Fig. 6 is a perspective view, partially cut away, of a second embodiment of the present invention.

As can be seen from Fig. 1, the assembled cutting tool of the present invention comprises a shank portion 1, a head portion 2, and a ridge 3 having a vertical shoulder 3a defining the rear boundary of the head portion. Firmly retained by the horizontal clamp head 4 of the cutter bit clamp 5 is the cutting insert or cutter bit 6. As can be seen from the drawing, cutter bit 6 is releasably held so that its cutting surface is exposed on the open outside of recess 8. Because heating or chattering of the bit in use may cause deformation of the supporting surface of bit 6, a properly shaped cutter bit seat 7 may be positioned on the bottom of the recess 8 in which the cutter bit is inserted. For purposes of clarity, the upper portion of the tool holder is considered that portion appearing uppermost in each of the figures of the drawing. The forward portion of the tool holder is considered the head portion and the shank portion is considered the rear portion. A plane parallel to the upper surface of shank 1 is therefore the horizontal plane and a plane parallel to the forward surface of vertical shoulder 3 is the vertical plane.

Figs. 2, 3, 4 and 5 show in greater detail the construction and relationship of the various parts of the cutting tool holder shown in perspective in Fig. 1. Clamp 5 comprises horizontal clamp head 4 and integral downward projecting shank or stem 9. The rear face 10 of horizontal clamp head 4 is adapted for alignment with vertical shoulder 3a thus providing for positioning of the clamp and proper transmittal of the cutting thrust to the shank. Tapered face 11 of horizontal clamp head 4 is protected from wear caused by chips by the provision of a cemented carbide surface on face 11 of the clamp. Alternately, the entire horizontal clamp head 4 may be composed of cemented carbide. Face 11 is also used as a chip breaker to control the length of chips in order to promote their ease of handling and disposal. Head portion 2 of the cutting tool holder contains recess 8 for insertion of cutter bit 6, and cutter bit seat 7 where used. Cutter bit seat 7 may be composed of any hard metallic substance, such as a cemented carbide, capable of withstanding deformation at high temperature. Cutter bit seat 7 is held in place by a screw member 12 centered in bit seat 7 for retaining the bit seat in position when changing or rotating the cutter bit. While the bit seat is preferred for maximum operating efficiency, it is not essential to the successful operation of the tool. The cutter tool holder may be designed without a bit seat or with a bit seat composed of materials other than cemented carbides, such as hardened steel or other hard substances capable of withstanding deformation at high temperatures. It should be noted, as can be clearly seen in Figs. 1, 2 and 5 that ridge 3 is cut away at 14 to provide a smooth, unobstructed chip flow, which is particularly advantageous in the case of light cuts.

A groove or channel 13 at the rear of recess 8 is provided which permits accurate alignment of bit 6 without damage to the inner corner of the bit. Aperture 15 is provided in the head portion 2 of the cutting tool holder. This aperture is unthreaded and counter bored to a depth slightly greater than the length of stem 9 of clamp 5. Aperture 15 is threaded in its smaller diameter below the counter bore in a first direction on its interior surface as can be seen in Fig. 4. Clamp member 5 also contains an aperture 16 which is threaded in an opposite direction from the aperture 15. Aperture 15 extends vertically through the lower surface of the head portion 2 to form an opening 17 (Fig. 4) on the lower surface of the head portion of the cutting tool holder. Stem 9 of cutter bit clamp 5 is received by the upper opening of aperture 15. Differential set screw 18 is threaded in a first direction, in its lower portion, and in a second direction in its upper portion. The upper portion of differential set screw 18 is adapted for threaded engagement with the threaded aperture 16 of clamp 5. The lower portion of differential set screw 18 is adapted for threaded engagement with the threads of aperture 15.

From the above, it will be apparent that cutter bit 6 may be tightened into position in the cutting tool holder or removed from the cutting tool holder by the single relatively simple step of loosening set screw 18. Thus, by inserting a hexagonal wrench 19 in the hexagonal opening 20, at the top of the differential set screw, clamp 5 is simultaneously loosened and lifted in aperture 15. In effect, as the differential set screw is loosened, the cutter bit is released from its position in the cutting tool holder, and at the same time the differential set screw acts as a jack to lift the clamp from the surface of the cutter bit. Conversely, when the differential set screw 18 is tightened, the tightening of the differential set screw simultaneously acts to lower the horizontal clamp head 4 into position to retain the cutter bit while the cutter bit is locked in place. At the same time, vertical shoulder 3a serves to align the horizontal clamp head 4 in position. Thus, a single tightening of the differential set screw acts simultaneously to align the clamp, tighten the cutter bit, and lower the horizontal clamp head into position. It should be noted, as can be most clearly seen from Fig. 3, that the surface of the clamp head 4 in contact with the cutter bit is at a very small acute angle of one or two degrees or even less from the horizontal transverse axis of the cutting tool holder. The surface of the clamp head 4 in contact with the cutter bit is at a similar small acute angle from the horizontal longitudinal axis. As can be seen most clearly from Figs. 1 and 2, the surface of the clamp head 4 in contact with the cutter bit possesses a very small acute angle beginning at 4a to the outer extremity of the cutter bit. The purpose of this is to assure a firm grip of the clamp head on the cutter bit on the outer extremity of the cutting edge of the cutter bit 6. It should also be noted, as shown by Fig. 4, that the differential set screw is accessible from both the top and the bottom of the cutting tool. Thus, if the cutting tool is installed with its upper surface facing down or on its side, the set screw is still easily accessible for removal, rotation or replacement of the cutter bit.

The cutter bits and recess for the cutter bit may be of other configurations. One such additional configuration is shown by Fig. 6 which shows an alternative embodiment of the present invention differing in certain aspects of the design of the ridge and in the configuration of the cutter bit insert. As can be seen from Fig. 6, the ridge 21 is tapered at 22 rather than cut away perpendicularly as in the cutting tool shown in Figs. 1 through 5. In addition, cutter bit 23 is square rather than triangular, as in the case of the cutter bit of Figs. 1 through 5. Otherwise, the construction and operation of the cutter bit shown in Fig. 6 is substantially identical with that shown in Figs. 1 through 5. Cutter bit seat 24 provides support for the cutter bit. Clamp 25 and differential set screw 26 retain the cutter bit in position and operate in the same fashion as described above in connection with Figs. 1 through 5.

While I have shown several embodiments of this invention, it will be understood, of course, that I do not wish to be limited in any sense except as defined by the claim which follows.

What I claim as new and desire to secure by Letters Patent of the United States is:

A cutting tool holder comprising axially aligned shank and head portions, a ridge extending partially across the upper surface of said tool holder transversely of said shank, a vertical shoulder at the front of said ridge defining the rear boundary of said head portion, said head portion containing a recess having a plurality of vertical walls and being open on at least one end thereof, the end of said ridge facing in the direction of the open end of said recess terminating at a sufficient distance from a side of said shank to provide a minimum of chip interference, an aperture having a lower threaded portion and an upper unthreaded portion extending vertically through said head portion between said recess and said vertical shoulder, a cutter bit horizontally positioned against the vertical walls of said recess, a cutter bit clamp releasably holding said cutter bit in said recess, said clamp having a horizontally disposed clamp head and a dependent stem projecting into said upper unthreaded portion of the aperture in said head portion, said clamp having a vertical threaded aperture extending through said clamp head and stem, the aperture in said clamp being threaded in an opposite direction from the aperture in said head portion, said clamp head having a vertical surface in abutting relation with said vertical shoulder for aligning said clamp head, said clamp head having a cemented carbide chip breaker surface at an acute angle to the horizontal plane of the cutter bit, the surface of the clamp head in contact with the cutter bit being at a small angle from both the transverse and horizontal axes of the cutting tool holder so that maximum holding pressure is exerted at the outer extremity of the cutter bit, and a single differential set screw having ends threaded in opposite directions in threaded engagement with the threaded apertures of both the head portion and the cutter bit clamp so that the surface of the clamp head in contact with the cutter bit is lifted out of engagement with said surface upon rotation of said screw in one direction and lowered into engagement upon rotation in the other direction.

References Cited in the file of this patent

UNITED STATES PATENTS

| | | |
|---|---|---|
| 2,181,023 | Moore | Nov. 21, 1939 |
| 2,378,094 | Nunes-Vaz | June 12, 1945 |
| 2,392,285 | Gauthier | Jan. 1, 1946 |
| 2,645,844 | Longe | July 21, 1953 |
| 2,706,327 | Bodin | Apr. 19, 1955 |
| 2,734,256 | Forward | Feb. 14, 1956 |
| 2,787,823 | Kennicott | Apr. 9, 1957 |
| 2,799,079 | Brigner | July 16, 1957 |
| 2,831,241 | Bader | Apr. 22, 1958 |
| 2,848,789 | Friedline | Aug. 26, 1958 |
| 2,854,735 | Dukes | Oct. 7, 1958 |
| 2,865,084 | Wendt | Dec. 23, 1958 |

OTHER REFERENCES

Developments in Tools with Tungsten Carbide, Other "Throw-away" Tips, from Machinery, Nov. 18, 1955, vol. 87, pp. 1199–1203.